(No Model.)

R. EXLEY.
WATER SPRINKLER.

No. 375,445.  Patented Dec. 27, 1887.

Witnesses:
J. P. Theo Lang
Robt. L. Fenwick

Inventor:
Robert Exley
by his attys
Mason, Fenwick and Lawrence

N. PETERS, Photo-Lithographer, Washington, D. C.

UNITED STATES PATENT OFFICE.

ROBERT EXLEY, OF PHILADELPHIA, PENNSYLVANIA.

WATER-SPRINKLER.

SPECIFICATION forming part of Letters Patent No. 375,445, dated December 27, 1887.

Application filed August 9, 1887. Serial No. 246,503. (No model.)

*To all whom it may concern:*

Be it known that I, ROBERT EXLEY, a subject of the Queen of Great Britain, now residing at Philadelphia, in the county of Philadelphia and State of Pennsylvania, have invented certain new and useful Improvements in Water-Sprinklers; and I do hereby declare the following to be a full, clear, and exact description of the invention, such as will enable others skilled in the art to which it appertains to make and use the same.

My invention consists in certain novel constructions, arrangements, and combinations of parts in a centrifugal apparatus for sprinkling water upon streets, as will be hereinafter described and specifically claimed, whereby one of each pair of the centrifugal sprinkling-disks can be adjusted, and also the mouth-piece of the supply, so as to insure the discharge of the water in the direction desired. The water can be shut off from one side or the other of the median line of the carriage of the machine, as may be necessary, in order to avoid wetting pedestrians or frightening horses attached to vehicles, and the discharge of water at the meeting portions of the pairs of disks is caused to be more nearly uniform in thickness, with the sheet or stream discharged on the side and forward of the said meeting portions of the respective pairs of disks.

Figure 1:
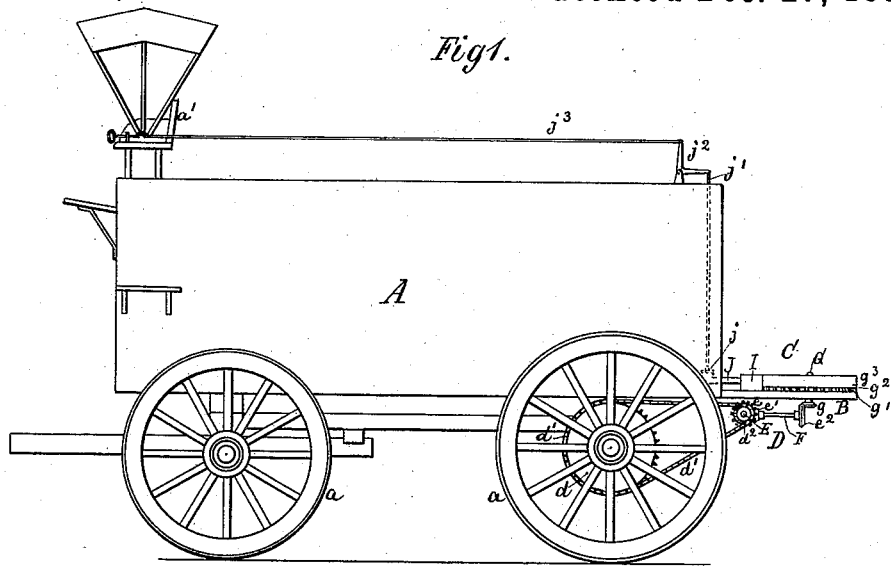
Figure 2:
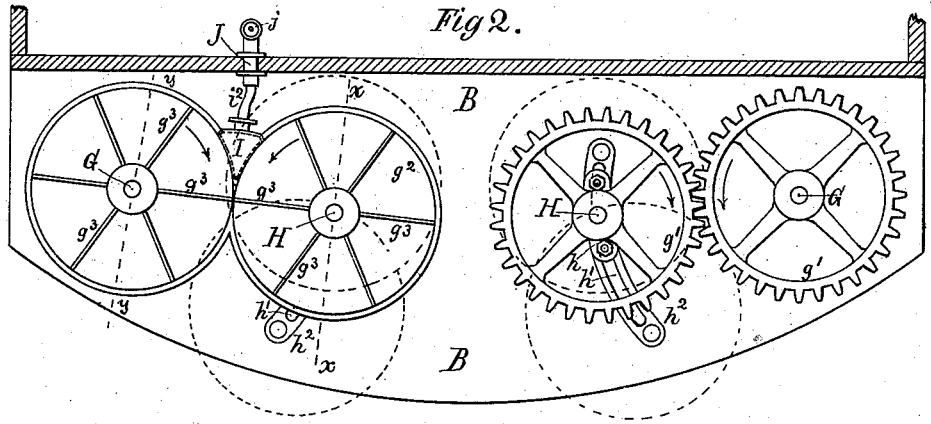
Figure 3:
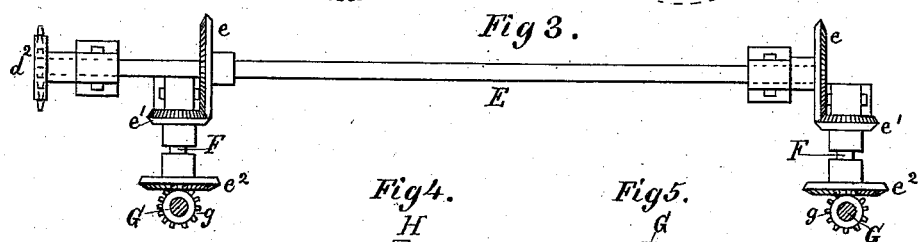
Figure 4:
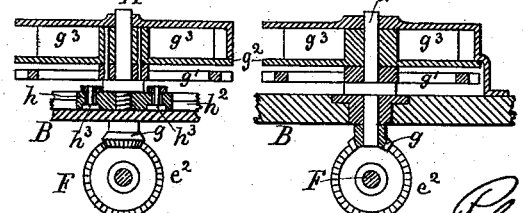
Figure 5:
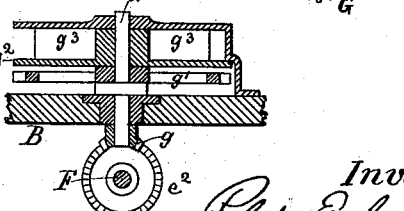
Figure 6:

In the accompanying drawings, Figure 1 is an elevation of a wheeled water-sprinkler provided with my invention. Fig. 2 is a horizontal section of a portion of the water-receptacle of the sprinkler and showing parts of my invention; in this view one of the mouth-pieces and its hose and a pair of the water-spraying wheels being removed; and Fig. 3 is a bottom view of the greater portion of the operating mechanism of the same. Fig. 4 is a section in the line $x\ x$ of Fig. 2. Fig. 5 is a section in the line $y\ y$ of Fig. 2, and Fig. 6 is a horizontal section of the tangential mouth-piece.

The letter A in the drawings represents a water-receptacle supported on wheels $a$ in the ordinary manner. A rear platform, B, is suitably attached to the said receptacle A, in order to support a sprinkling mechanism, C, above and the operating mechanism thereof below.

The operating mechanism D consists, first, of a sprocket-wheel, $d$, fastened to one of the rear wheels, $a$, and a chain, $d'$, driving a sprocket-pinion, $d^2$, which is fastened to a horizontal shaft, E. This shaft E is suitably hung to the lower side of the platform B, and is provided with two bevel-wheels, $e\ e$, which are in gear with smaller bevel-wheels, $e'\ e'$, on two horizontal shafts, F, hung at right angles to the shaft E. Two larger bevel-wheels, $e^2\ e^2$, are attached to the shaft F, whereby two small bevel-wheels, $g\ g$, on two vertical shafts, G G, are revolved. The shafts G G extend through and above the platform, to which they are suitably hung, and are provided each with a toothed wheel, $g'$, and a disk, $g^2$, having radial vertical wings $g^3$ and suitably housed, as shown. Between the wheels $d$ and $g$ the speed of the mechanism is very considerably increased, so that the disks $g^2$ revolve with great rapidity and develop such a centrifugal force that they are enabled to throw water at a long distance. Each of the two disks $g^2$ is provided with a mate, $g^2$, of the same construction, hung to a stud, H, and coupled with a wheel, $g'$, which latter gears into a wheel, $g'$, on the shaft G. Thus the disks revolve at a uniform speed and deliver the spray they form between themselves in a straight direction and in uniform quantities.

From the drawings it will be seen that the studs H of the right and left hand pairs of disks are set on a line with each other, but forward of the shafts G G of said pairs of disks, and that the said shafts G G are on a line with one another. The object of thus arranging the disks is to cause the water to be discharged in a sheet of more uniform thickness throughout than takes place when the studs and shafts are all arranged on the same transverse line, which is parallel with the back part of the water-tank. This result will be accomplished whether the studs H be adjusted either in rear or forward of the shafts G, as hereinbefore described and illustrated.

The stud H is fastened to a slide, $h$, which moves in a slot, $h'$, of a curved guide, $h^2$, and to which it is fastened by means of screw-bolts $h^3$. The slots $h'$ are made concentric to the shafts G, and thus the mated disks $g^2$ are kept in contact at any position the studs H may occupy in the guides $h^2$. Between the mated disks $g^2$ a mouth-piece, I, is inserted, the sides $i$ of which are concentric with the disks and fit the same without causing friction, leaving a narrow central opening, $i'$, for the efflux of the water. In Fig. 2 the dotted circles are intended to represent the extreme positions at which the movable mate disks may be adjusted for the purpose of changing the direction of the discharge of the water or spray. A hose, $i^2$, is attached to the said mouth-piece and fastened to a pipe, J, in the water-receptacle, which pipe is provided with a suitable valve, $j$, operated by a rod, $j'$, bell-crank $j^2$, and horizontal rod $j^3$, the latter extending to the driver's seat $a'$. The mouth-piece I is, by means of the pressure of the water, kept close to the disks; but it may be suitably fastened to the slide $h$, in order to guard against displacement by reason of jolts of the vehicle while in motion.

The water-sprinkling disks being arranged in pairs on each side of the central or median line of the machine, as shown, and each pair provided with its own supply-valve and flexible hose having a tangential mouth-piece, the water can be stopped on either side entirely when pedestrians are in range of it or when horses are liable to be frightened by sprinkling water toward or upon them. Further, by having one of each pair of disks adjustable in an arc of a circle concentric with the stud H of a fellow disk, the water can be directed either inward or outward to a greater or less extent with respect to the curbs of the sidewalks or the center of the street, and thus be thrown right and left toward the respective curbstones or all toward the center of the street.

When the receptacle is supplied with water, the driver on the seat $a'$ starts the horses attached to the apparatus, and when the proper speed of the same and of the disks $g^2$ is obtained he pulls the valve $j$ open, and thus admits the water into the mouth-piece I, which emits it through the opening $i'$ into the disks $g^2$ in such manner that one-half of its width is in range of either disk, or each disk receives one-half of the amount of water discharged through the opening $i'$. The stream of water thus flowing to the disks is struck and divided into small drops by the horizontal revolving radial wings $g^3$, by which they are hurled off in the form of spray. The radial wings, coming successively into action, keep up a continuous and uniform discharge of the water. The spray may be directed parallel to the axis of the apparatus or at an inclination to the same, as circumstances may require, by adjusting one of the spraying-wheels of each pair, said adjustment being effected by means of the slide $h$ and slotted curved guide $h^2$, as shown.

When the adjustments are made, the spraying-disks will occupy either the position indicated by full black lines or the dotted circles described in Fig. 2. The spray can also be made more or less copious by opening the valve $j$ to a greater or less extent.

What I claim as my invention is—

1. The combination of a water-tank, A, mounted on a wheeled carriage and having a rearwardly-extended platform, B, and a water-discharging valve or valves, one or more pairs of sprinkling-disks, $g^2$, provided with radial wings $g^3$, the shaft G of one of the disks of a pair being on a line in rear or forward of the stud H of the other disk, a tangential mouth-piece, I, and the gearing D, arranged beneath the platform and connected to one of the rear wheels of the carriage and to the pair or pairs of disks for operating said disks, substantially as and for the purpose described.

2. The combination of a water-tank, A, having discharge-valves and connections for operating the same, a platform, B, mouth-pieces I, and centrifugal sprinkling-disks $g^2$ $g^2$, having vertical radial wings $g^3$ $g^3$, hose $i^2$, attached to tank A and carrying said mouth-pieces, wheel $a$ of sprinkler-carriage, having gearing-wheel $d$ attached to it, chain $d'$, horizontal shaft E, hung on the under side of platform and having wheel $d^2$ on it, over which wheel and the wheel $d$ said chain passes, gears $e$ $e$ on shaft E, shafts F F, also hung on under side of platform and running horizontally at right angles to shaft E and each having a gear, $e'$ and $e^2$, and vertical shafts G G, each having a gear, $g$, meshing in a gear, $e$, below the platform, and each a wheel, $g'$, above the platform and gearing into similar wheels, $g'$, on vertical studs H H, also above said platform, substantially as and for the purpose described.

3. In the described sprinkling apparatus, one of the winged spray-disks of the respective pairs of disks made adjustable by means of a slotted curved guide, $h^2$, slide $h$, and bolts $h^3$, substantially as and for the purpose described.

4. In the described sprinkling apparatus, the mouth-piece I, applied in an adjustable manner to the platform of the sprinkler, in combination with a pair of horizontal winged spray-disks, one of which is made adjustable in an arc of a circle concentric with the shaft of the other and with respect to the mouth-piece, substantially as and for the purpose described.

In testimony whereof I affix my signature in presence of two witnesses.

ROBERT EXLEY.

Witnesses:
 FRANCIS LECLÉRE,
 WILLIAM C. STOEVER.